Jan. 26, 1954
M. S. FRED ET AL
2,667,178
LIQUID LEVEL CONTROL
Filed Jan. 24, 1951
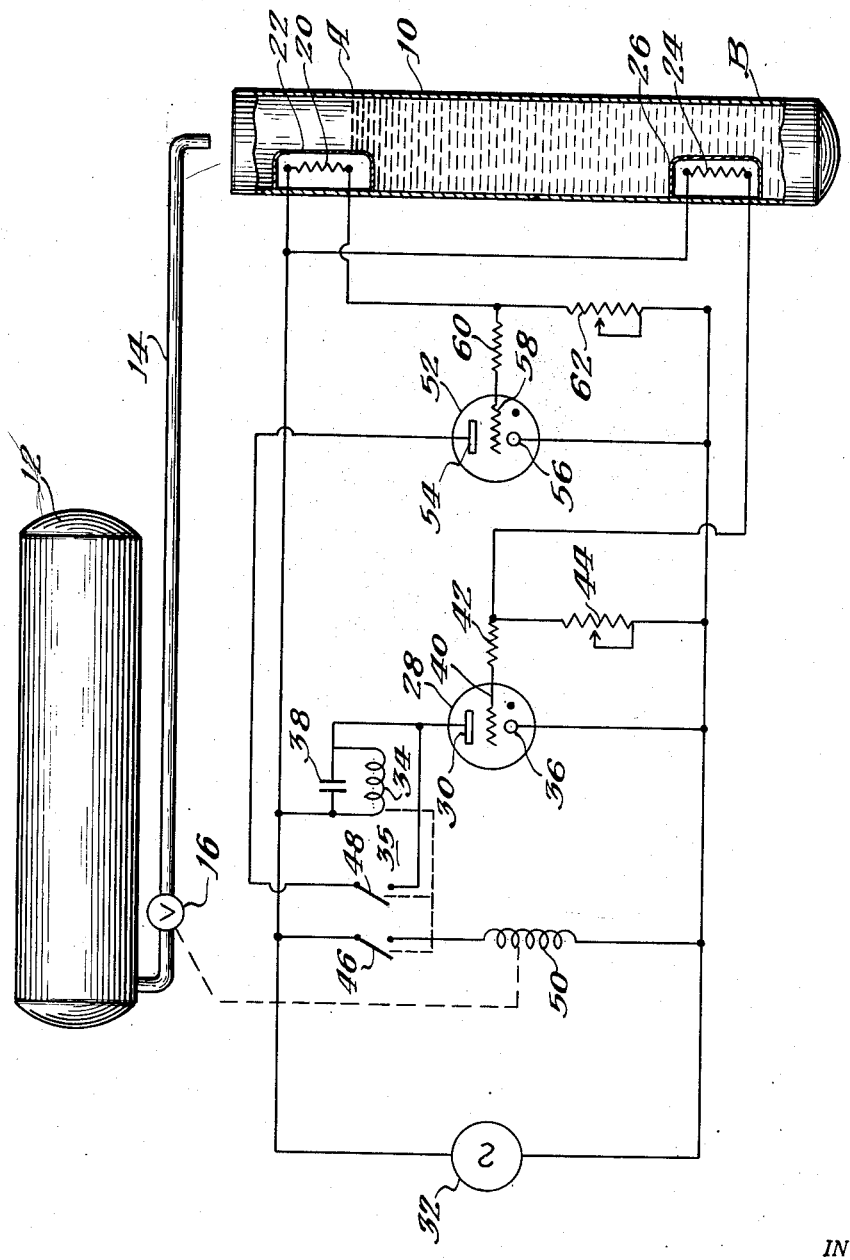
INVENTORS:
Mark S. Fred
Everett G. Rauh
BY
Roland A. Anderson
Attorney Patented Jan. 26, 1954

2,667,178

UNITED STATES PATENT OFFICE 2,667,178

LIQUID LEVEL CONTROL

Mark S. Fred, Chicago, and Everett G. Rauh, Hinsdale, Ill., assignors to the United States of America as represented by the United States Atomic Energy Commission Application January 24, 1951, Serial No. 207,638

8 Claims. (Cl. 137—392)

This invention relates to devices responsive to two limiting conditions. Specifically, the invention relates to a device providing independent control of the upper and lower levels of a liquid in a container.

This invention has particular utility when used to maintain the level of a liquefied gas in a container. Liquefied gas is used to include all substances that are in a gaseous state at room temperature, but have been cooled to a liquid state, such as liquid air, liquid nitrogen and liquid oxygen. The liquefied gas will revert to a gaseous state if its temperature is permitted to rise, and hence it is important to maintain the surfaces confining the liquefied gas at a temperature below its boiling point. It is generally impractical to provide adequate insulation for the pipe conducting the liquefied gas from its supply tank to the chamber in which it is being utilized, and hence considerable economy of liquefied gas may be achieved by lengthening the period of time elapsing between transfers of the liquefied gas from its supply tank to the container in which it is being utilized. The length of these periods may be extended most readily by permitting the level of the liquefied gas to vary within the container over the widest permissible range, and this in turn may be done most effectively by controlling the upper and lower levels of the liquefied gas independently.

The present invention has been designed to provide independent control of the upper and lower levels of the liquefied gas in the container, and is illustrated by the sole figure which is a schematic electrical circuit diagram which includes a schematic representation of the associated liquefied gas system.

The liquefied gas is to be maintained between levels A and B within the container 10. A supply of liquefied gas is maintained in the storage tank 12 and is transferred into the container 10 by means of a pipe 14. The storage tank 12 is mounted above the container 10, so that the liquefied gas may flow through the pipe 14 into the container 10 by means of gravity. A valve 16 is inserted in the pipe to control the flow of liquefied gas therethrough. The valve 16 is electrically operated by the level control circuit to be described hereafter.

The electrical control circuit makes use of the negative coefficient of resistance of carbon resistors to provide an electrical signal in response to the level of the liquefied gas within the container 10. The upper level A of the liquefied gas is controlled by resistor 20 which is mounted within the container 10 slightly above the highest level A that the liquefied gas is to be permitted to attain. If the liquefied gas is corrosive, the resistor 20 may be protected by a heat-conducting capsule 22 which surrounds the resistor 20, but there will be better heat conduction without the capsule 22 and more sensitive control of the level of the liquefied gas. In like manner, a resistor 24 is mounted within a capsule 26 at a point just above the lowest level B that the liquefied gas is to be permitted to fall within the container 10.

The lower level control resistor 24 controls the firing potential of thyratron tube 28, and is connected in the circuit in the following manner. The plate 30 of tube 28 is connected to an alternating current generator 32 through the coil 34 of a relay 35, and the cathode 36 of the thyratron tube 28 is connected to the other terminal of the generator 32. A condenser 38 is connected in parallel with the relay coil 34. The control grid 40 of the thyratron tube 28 is connected to the center point of a voltage divider through resistor 42. The voltage divider consists of rheostat 44 and the lower level control resistor 24, and is connected across the generator 32. The relay coil 34 operates two sets of switch contacts, 46 and 48. The coil 50 of the solenoid valve 16 is connected across the output of the generator 32 through contacts 46.

The upper level control resistor 20 controls the operation of thyratron tube 52, and is connected in the circuit as follows. The plate 54 of thyratron tube 52 is connected to the plate 30 of thyratron tube 28 through contacts 48 of the relay 35. The cathode 56 of thyratron tube 52 is directly connected to the cathode 36 of thyratron tube 28. The control grid 58 of thyratron tube 52 is connected to a voltage divider through a resistor 60. The voltage divider consists of the upper level control resistor 20 and a rheostat 62, and is connected across the output of the generator 32.

With the alternating current generator 32 operating and the level of the liquefied gas within the container at or below the lower level B, liquefied gas will be permitted to flow into the container 10. Under these conditions, the plate 30 of thyratron tube 28 will be positive for one-half of the cycle of the generator 32. During this same period a positive voltage will be applied to the control grid 40 of thyratron tube 28 through resistor 42 and the voltage divider consisting of the lower level control resistor 24 and the rheostat 44. Since the level of the liquefied gas in the container 10 is at the lower level B or lower, the temperature of the lower level control resistor 24 will have risen to a value more nearly that of the ambient temperature, and hence the resistance of the lower level control resistor 24 will have decreased because of its negative coefficient of the resistance. Hence during the positive portion of the generator cycle, the control grid 40 of the thyratron tube 28 will be at its greatest positive potential and current will flow through the thyratron tube 28 from plate 30 to the cathode 36. The current through the thyratron tube 28 also flows through the relay coil 34, thus closing the contacts 46 and 48. The closing of contacts 46 connects the coil 50 of the solenoid valve 16 across the generator 32 and actuates the solenoid valve, thus permitting liquefied gas from the storage gas 12 to flow through the solenoid valve 16 and the pipe 14 into the container 10. As the liquefied gas rises in the container 10 above the lower level B, lower level control resistor 24 will be cooled to the temperature of the liquefied gas, and hence the resistance of the lower level control resistor 24 will increase. The increase in the resistance of the lower level control resistor 24 is effective to decrease the positive potential applied to the control grid 40 of thyratron 28 to a value below the firing point of the thyratron tube 28. Hence, thyratron tube 28 will cease to conduct.

However, when the thyratron tube 28 began to conduct, not only contacts 46 were closed, which began the filling of container 10 with liquefied gas, but contacts 48 were also closed, thus connecting the plate 54 of thyratron tube 52 to the plate 30 of thyratron tube 28. In this manner, the plate 54 of thyratron tube 52 was placed at a positive potential with respect to its cathode 56. Hence, thyratron tube 52 will also conduct, since the control grid 58 is also at its greatest positive potential with respect to the cathode 56 as a result of the temperature of the upper level control resistor 20 being approximately that of the ambient temperature. Thus, thyratron tube 52 is conducting as well as thyratron tube 28. However, thyratron tube 52 continues to conduct after the level of the liquefied gas in the container 10 has risen above level B and increased the resistance of the lower level control resistor 24, thus cutting off thyratron tube 28. Thyratron tube 52 will continue to conduct until the level of the liquefied gas in the container 10 reaches the upper level control resistor 20, and causes its resistance to increase sufficiently to drop the potential on the control grid 58 of the thyratron tube 52 to a value below the firing potential of the tube. When this condition is reached thyratron tube 52 will also cease to conduct, and the current flowing through relay coil 34 will cease, thus opening contacts 46 and 48. By opening contacts 48, thyratron tube 52 is rendered unable to conduct even though the potential of the control grid 58 becomes greater than the firing potential, because the plate voltage has been removed from the plate 54 of the tube 52. Hence, only thyratron tube 28 is in a position to conduct, as regards plate potential, when the level of the liquefied gas is between levels A and B, and it will do so only when the resistance of the lower level control resistor 24 falls sufficiently to allow its control grid 40 to increase to the firing potential of the tube 28. Since this can only be achieved by lowering the level of the liquefied gas in the container 10 to the level B or lower, it is clear that the liquefied gas is always maintained between the levels A and B in the container 10.

A particularly desirable application for the above-described device is the control of liquid air within the container 10. The resistors 20 and 24 will then be subjected to a change in temperature from approximately $+20°$ C. to $-180°$ C., and they will change their resistances by a factor of approximately 1.7. The resistors 20 and 24 may each be carbon resistors with resistances of approximately 60,000 ohms. With 0A4G thyratron tubes and a 115 volt A. C. generator, the rheostats 44 and 62 may be approximately 250,000 ohms. A suitable value for resistors 42 and 60 with the above circuit parameters has been found to be approximately 100,000 ohms.

The rheostats 44 and 62 adjust the potential supplied to the control grids 40 and 58 of the thyratron tubes 28 and 52, and consequently control the position of levels A and B with respect to the position of the control resistors 20 and 24.

These rheostats 44 and 62 may be adjusted in the following manner. With the level of the liquefied gas in the container 10 below the level B, rheostat 44 should be adjusted to its minimum resistance, and rheostat 62 should be adjusted to its maximum resistance, and contacts 46 and 48 should be open. Rheostat 44 is then adjusted until the thyratron 28 fires, closing contacts 46 and 48 and starting the flow of liquefied gas into the container 10. The liquefied gas is permitted to rise until it reaches the desired level A, and then rheostat 62 is adjusted to open the relay 35 and stop the flow of the liquefied gas into the container 10. It is to be noted that if rheostat 62 is set at 0 resistance, thyratron tube 52 will never conduct, and the level of the liquid in the container 10 will be controlled within a few millimeters by thyratron tube 28 and the lower level control resistor 24.

It is thus clear, that the device described is effective to provide a positive control for both the upper and lower levels of the liquefied gas which is to be maintained between the two levels in a container. The man skilled in the art will readily adapt the device here described to other applications. One such application clearly would be the use of this device with a liquid at a temperature greater than the ambient temperature, this modification requiring merely the substitution of resistors having a positive thermal coefficient of resistance for the upper and lower level control resistors. Also, the scope of this invention should not be construed to be limited to controlling liquid levels between definite limits, since it is clear that any condition which is measurable in terms of a change may be controlled between two limits by this device. Hence, the scope of this invention should be construed only in the light of the following claims.

What is claimed is:

1. A device responsive to two limiting conditions comprising, in combination, two measuring elements producing a change in electrical resistance in response to a change in the condition to be responded to, a two terminal current source, a first electron discharge tube having a plate, cathode and control electrode, the cathode of said tube being connected to the first terminal of the current source, a relay having a field coil connected between the plate of said tube and the second terminal of the current source, said relay having at least one pair of switch contacts, one of said contacts being directly connected to the plate of said tube, a resistor connected between the control electrode of said tube and the cathode thereof, the first of said measuring elements being connected between the second terminal of the current source and the control electrode of said tube, a second electron discharge tube having a plate, cathode and control electrode, the plate of said tube being connected to the other contact of the relay, and the cathode being connected to the first terminal of the current source, a resistor connected between the control electrode of said second tube and the cathode thereof, and said second measuring element being connected between the second terminal of the current source and the control electrode of said second tube.

2. A device responsive to two limiting conditions comprising, in combination, two temperature responsive resistors having resistances that decrease when subjected to the limiting condition, a two terminal current source, a first electron discharge tube having a plate, cathode and control electrode, the cathode of said tube being connected to the first terminal of the current source, a relay having a field coil connected between the plate of said tube and the second terminal of the current source, said relay having at least one pair of switch contacts, one of said contacts being directly connected to the plate of said tube, a resistor connected between the control electrode of said tube and the cathode thereof, the first of said temperature responsive resistors being connected between the second terminal of the current source and the control electrode of said tube, a second electron discharge tube having a plate, a cathode and a control electrode, the plate of said tube being connected to the other contact of the relay, and the cathode of said tube being connected to the first terminal of the current source, a resistor connected between the control electrode of said second tube and the cathode thereof, and the second of said temperature responsive resistors being connected between the second terminal of the current source and the control electrode of the second tube.

3. A device responsive to two limiting conditions comprising, in combination, two temperature responsive resistors having resistances that decrease in response to the limiting condition, an alternating current generator, a first gas-filled thyratron tube having a plate, cathode and control electrode, the cathode of said tube being connected to one of the terminals of the current source, a relay having a field coil connected between the plate of said tube and the other terminal of the current source, said relay having at least one pair of switch contacts, one of said contacts being directly connected to the plate of said tube, a resistor connected between the control electrode of the tube and the cathode thereof, the first of said temperature responsive resistors being connected between the junction of the relay and the generator and the control electrode of the thyratron tube, a second gas-filled thyratron tube having a plate, cathode and control electrode, the plate of said tube being connected to the other contact of the relay, and the cathode of said tube being connected to the cathode of the first thyratron tube, a resistor connected between the control electrode of said second thyratron tube and the cathode thereof, and said second temperature responsive resistor being connected between the junction of the relay field coil and the generator and the control electrode of said second thyratron tube.

4. A device for controlling the level of a liquid between two limits, the liquid having a temperature other than the ambient temperature of the surroundings, comprising the elements of claim 2 in combination with a container adapted to contain the liquid whose level is to be controlled, the first temperature responsive resistor being mounted within the container on the highest level that the liquid is to attain, and the second temperature responsive resistor being mounted on the lowest level in the container that the liquid is to attain, a source of liquid, and means to convey the liquid into the container from the source, said means including means to interrupt the flow of said liquid in response to the opening of the relay.

5. A device for maintaining the level of a liquid in a container between two limits, comprising the elements of claim 3 in combination with a container adapted to contain the liquid, the first of the temperature responsive resistors being mounted within the container on the highest level that the liquid is to attain, and the second of said temperature responsive resistors being mounted within the container on the lowest level that the liquid is to fall, a source of liquid, and means to convey the liquid from the source to the container, said means including a solenoid operated valve mounted in the path of the liquid between the source and the container, the solenoid of said valve being connected across the A. C. generator through a second pair of contacts of said relay.

6. A device responsive to two limiting conditions comprising, in combination, two measuring elements producing a change in electrical resistance in response to a change in the condition to be responded to, a two terminal current source, a first electron discharge tube having a plate, a cathode, and a control electrode, the cathode of said tube being connected to the first terminal of the current source, a relay having a field coil connected between the plate of said tube and the second terminal of the current source, said relay having at least one pair of switch contacts, one of said contacts being directly connected to the plate of said tube, a resistor connected to the first measuring element, the junction between said resistor and the first measuring element being connected to the control electrode of the tube, and said resistor and control element being connected in series with the current source, a second electron discharge tube having a plate, cathode, and control electrode, the plate of said tube being connected to the other contact of the relay, and the cathode of said tube being connected to the first terminal of the current source, a second resistor connected to said second measuring element, the junction between said second resistor and second measuring element being connected to the control electrode of the second electron discharge tube, said second resistor and said second measuring element being connected in series with the current source.

7. A device for controlling the level of a liquid between two limits, the liquid having a temperature other than the ambient temperature of the surroundings, comprising the elements of claim 6 in combination with a container adapted to contain the liquid whose level is to be controlled, the first temperature responsive resistor being mounted within the container on the highest level that the liquid is to attain, and the second temperature responsive resistor being mounted on the lowest level in the container that the liquid is to attain, a source of liquid, and means to convey the liquid into the container from the source, said means including means to interrupt the flow of said liquid in response to the opening of the relay.

8. A device responsive to two limiting conditions comprising, in combination, a two terminal electric current source, a first electron discharge tube having a plate, cathode and control electrode, the cathode of said tube being connected to the first terminal of the current source, a relay having a field coil connected between the plate of said tube and the second terminal of the current source, said relay having at least one pair of switch contacts, one of said contacts being directly connected to the plate of said tube, means producing a voltage responsive to the condition to be controlled connected between the control electrode and cathode of said tube, a second electron discharge tube having a plate, cathode and control electrode, the plate of said tube being connected to the other contact of the relay, and the cathode being connected to the first terminal of the current source, and a second means producing a voltage responsive to the condition to be controlled connected between the control electrode and cathode of said tube.

MARK S. FRED.
EVERETT G. RAUH.

References Cited in the file of this patent

UNITED STATES PATENTS

| Number | Name | Date |
| --- | --- | --- |
| 1,880,524 | Taylor | Oct. 4, 1932 |
| 2,243,188 | Biach | May 27, 1941 |
| 2,468,791 | Thomson | May 3, 1949 |
| 2,498,232 | Andrews | Feb. 21, 1950 |
| 2,523,363 | Gehman | Sept. 26, 1950 |